UNITED STATES PATENT OFFICE.

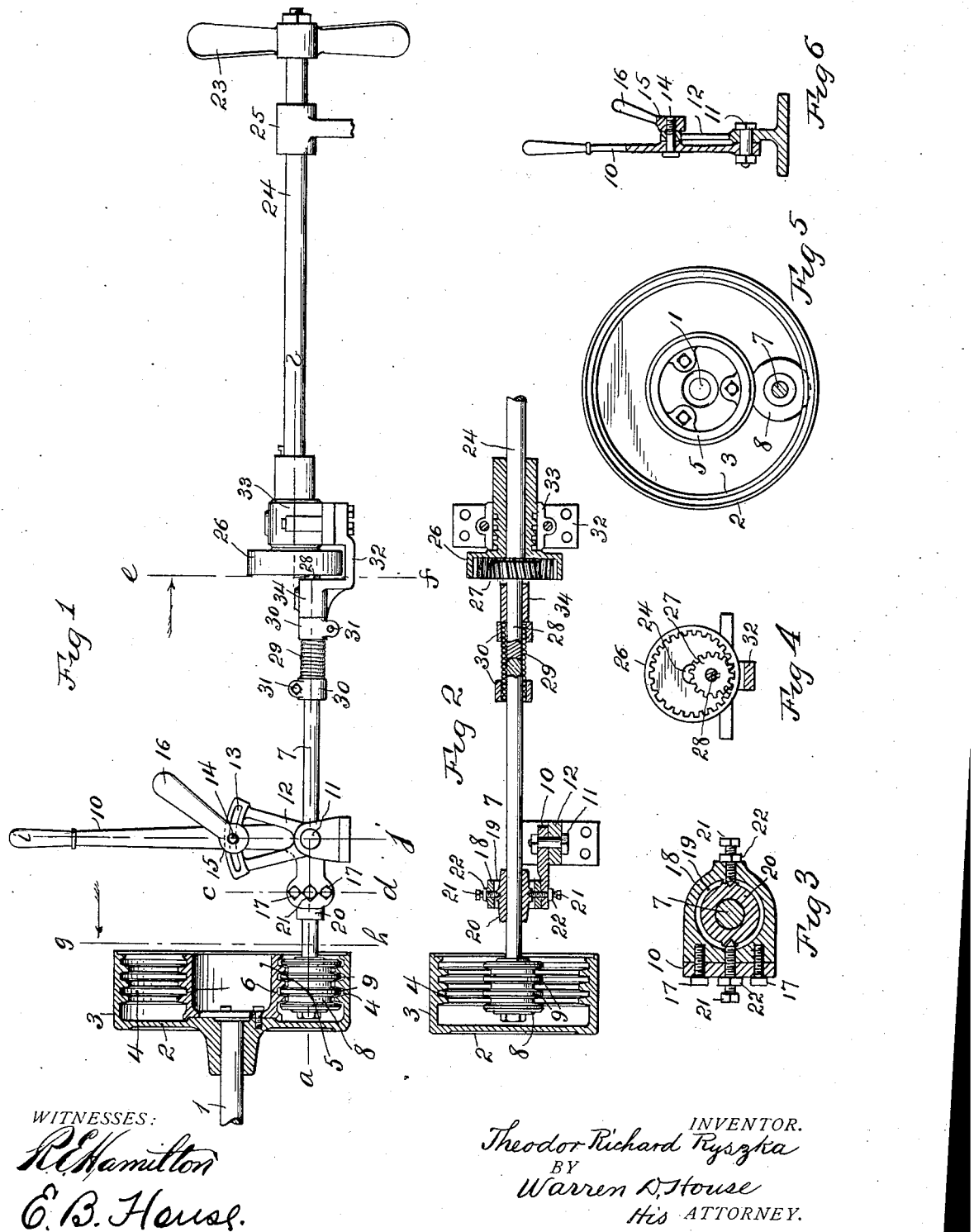

THEODOR RICHARD RYSZKA, OF BALTIMORE, MARYLAND.

POWER-TRANSMISSION MECHANISM.

1,033,273.   Specification of Letters Patent.   Patented July 23, 1912.

Application filed October 11, 1911. Serial No. 654,050.

*To all whom it may concern:*

Be it known that I, THEODOR RICHARD RYSZKA, a citizen of the United States, residing at Baltimore, in the State of Maryland, have invented a certain new and useful Improvement in Power - Transmission Mechanism, of which the following is a specification.

My invention relates to improvements in power transmission mechanism.

The object of my invention is to provide a simple, compact, strong and durable power transmitting mechanism particularly adapted for driving propellers of motor boats.

The novel features of my invention are hereinafter fully described and claimed.

In the accompanying drawings I have illustrated a preferred form of my invention.

Figure 1 is a view partly in side elevation and partly in vertical section of my improved power transmission mechanism, the operating lever being shown in the neutral position. Fig. 2 is a horizontal sectional view on the line *a—b* of Fig. 1, some of the parts being broken away. Fig. 3 is an enlarged cross section on the line *c—d* of Fig. 1. Fig. 4 is a cross section on the line *e—f* of Fig. 1. Fig. 5 is a cross section on the line *g—h* of Fig. 1. Fig. 6 is a vertical sectional view on the line *i—j* of Fig. 1.

Similar reference characters designate similar parts in the different views.

1 designates a horizontal driving shaft rotatable by any desired type of engine, not shown, the shaft having secured to and rotatable with it a friction wheel 2 having an annular concentric end flange 3 provided on its inner surface with annular grooves 4. Secured rigidly to the wheel 2 and disposed concentrically with the flange 3 is a smaller friction wheel 5 having peripheral grooves 6 which register with the grooves 4.

A laterally movable shaft 7 has secured to one end a friction wheel 8 disposed between the flange 3 and wheel 5 and provided with annular peripheral flanges 9 adapted to alternately enter the grooves 4 and 6 and to have driving contact with the wheels 2 and 5 when an operating lever 10 is swung alternately to two positions at opposite sides of a neutral position, in which latter position the lever 10 is shown in Fig. 1. The lever 10 is pivoted by a horizontal bolt 11 to a suitable support comprising a standard 12 having an arcuate slot 13 through which extends a bolt 14 movable lengthwise of the slot and secured to the lever 10. For clamping the lever in the position to which it is adjusted, a nut 15 having a handle 16 is mounted on the bolt 14 and is adapted to bear against the standard 12.

Rigidly secured to the lever 10 by bolts 17 is a block 18 having a horizontal hole 19 in which is mounted a bearing member 20 in which is rotatively mounted the shaft 7 and which is pivoted in the block 18 by means of two horizontal bolts 21 mounted in diametrically opposite positions in the block 18 and having their inner ends respectively pivotally mounted in recesses provided therefor in opposite sides of the block 18. Lock nuts 22 may be mounted on the bolts 21 and adapted to bear against the block 18 for respectively clamping the said bolts in the positions to which they may be adjusted.

A propeller 23 is rigidly secured to a horizontal propeller shaft 24 which is mounted in a bearing 25 and has secured to it an internal gear wheel 26 which meshes with a pinion 27 which is secured to a horizontal intermediate shaft 28 preferably disposed end to end relative to the shaft 7 to which it may be connected by any suitable flexible coupling means. In the drawing I have illustrated a coupling means comprising a coil spring 29 which encircles the adjacent ends of the shafts 7 and 28 to which the ends of the spring are secured respectively by split clamping rings 30 which embrace the spring 29 to which the rings are clamped by bolts 31.

A support comprising, preferably, a U shaped bracket 32 has its arms provided respectively with bearings 33 and 34 in which are respectively rotatively mounted the shafts 24 and 28. The internal gear wheel 26 is disposed between the arms of the bracket 32 which serve to receive the end thrust communicated to the gear wheel 26 by the propeller shaft 24.

By employing an internal gear wheel 26 to coöperate with the pinion 27, space is conserved, a desirable feature in a motor boat, and the gearing connecting the shafts 24 and 28 is not so liable to catch the clothing or the fingers of an occupant of the boat, as would be the case were other gearing employed.

In operating my invention, the nut 15 is loosened and the lever 10 swung, for example, to the left, as viewed in Fig. 1. The shaft 7 will thus be swung through the intermediacy of the block 18 and bearing member 20 so that the friction wheel 8 will engage the flange 3 of the wheel 2. The shaft 7 will thus be rotated in one direction, thereby rotating the propeller 23 in like direction through the intermediacy of the spring 29, shaft 28, pinion 27, gear wheel 26 and shaft 24. By swinging the lever 10 to the right of the neutral position shown in Fig. 1, the friction wheel 8 may be made to engage the wheel 5, thereby reversing the direction of rotation of the shaft 7 and of the propeller 23. After the lever 10 has been swung to the desired position, it is secured in such position by tightening the nut 15.

I do not limit my invention to the structure shown and described as modifications, within the scope of the appended claims, may be made without departing from the spirit of my invention.

Having thus described my invention, what I claim and desire to secure by Letters Patent, is:—

1. In power transmission mechanism, a laterally movable shaft, a lever, a bearing member pivotally mounted on the lever and in which the shaft is rotatively mounted, driving means by which the shaft may be alternately rotated in opposite directions when the lever is alternately swung to two positions at opposite sides of a neutral position, a propeller shaft, an intermediate shaft, gearing connecting the propeller and intermediate shafts, and flexible coupling means connecting the laterally movable and intermediate shafts.

2. In power transmission mechanism, a laterally movable shaft, a lever, a bearing member pivotally mounted on the lever and in which the shaft is rotatively mounted, driving means by which the shaft may be alternately rotated in opposite directions when the lever is swung alternately to two positions at opposite sides of a neutral position, a propeller shaft, an intermediate shaft, an internal gear wheel and a pinion meshing with each other and respectively secured one to the propeller shaft and one to the intermediate shaft, and flexible coupling means connecting the laterally movable and intermediate shafts.

3. In power transmission mechanism, a laterally movable shaft, a lever, a bearing member pivotally mounted on the lever and in which the shaft is rotatively mounted, driving means by which the shaft may be alternately rotated in opposite directions when the lever is alternately swung to two positions at opposite sides of a neutral position, a propeller shaft, an intermediate shaft, an internal gear wheel and a pinion secured one to the propeller shaft and the other to the intermediate shaft and meshing with each other, flexible coupling means connecting the laterally movable and intermediate shafts, and a U shaped support the arms of which have bearings between which the said gear wheel is located and which respectively support the propeller and intermediate shafts.

4. In power transmission mechanism, a laterally movable shaft, a lever, a bearing member pivoted to the lever and in which said shaft is rotatively mounted, driving means by which the shaft may be alternately rotated in opposite directions when the lever is alternately swung to two positions at opposite sides of a neutral position, and means for releasably holding the lever in the position to which it may be swung.

5. In power transmission mechanism, a laterally movable shaft, a lever, a bolt carried by the lever, a bearing member pivoted to the lever and in which the shaft is rotatively mounted, driving means by which the shaft may be alternately rotated in opposite directions when the lever is swung alternately to two positions at opposite sides of a neutral position, a support to which the lever is pivoted, the support having a slot through which said bolt extends and in which the bolt is movable lengthwise of the slot, and a nut mounted on the bolt and adapted to bear against said support for clamping the lever in the position to which it may be adjusted.

In testimony whereof I have signed my name to this specification in presence of two subscribing witnesses.

THEODOR RICHARD RYSZKA.

Witnesses:
GEORGE C. STAHL,
LOUISE EIERMANN.

---

Copies of this patent may be obtained for five cents each, by addressing the "Commissioner of Patents, Washington, D. C."